(12) United States Patent
Schulte (10) Patent No.: US 9,434,224 B2
(45) Date of Patent: Sep. 6, 2016

(54) CONNECTING DEVICE FOR CONNECTING A TARGET OBJECT TO A TOWING VEHICLE FOR TEST DRIVING FOR FUNCTIONALLY TESTING A DRIVER ASSISTANCE SYSTEM AND CORRESPONDING TEST ARRANGEMENT

(71) Applicant: Continental Safety Engineering International GmbH, Alzenau (DE)

(72) Inventor: Mark Schulte, Seligenstadt (DE)

(73) Assignee: Continental Safety Engineering International GmbH, Alzenau (DE)

( * ) Notice: Subject to any disclaimer, the term of this patent is extended or adjusted under 35 U.S.C. 154(b) by 0 days.

(21) Appl. No.: 14/426,295

(22) PCT Filed: Oct. 11, 2013

(86) PCT No.: PCT/DE2013/200218
§ 371 (c)(1),
(2) Date: Mar. 5, 2015

(87) PCT Pub. No.: WO2014/059984
PCT Pub. Date: Apr. 24, 2014

(65) Prior Publication Data
US 2015/0210129 A1    Jul. 30, 2015

(30) Foreign Application Priority Data

Oct. 15, 2012   (DE) .................. 10 2012 109 815
Nov. 6, 2012    (DE) .................. 10 2012 110 586

(51) Int. Cl.
*B60D 1/18*     (2006.01)
*B60D 1/24*     (2006.01)
*G01M 17/007*   (2006.01)

(52) U.S. Cl.
CPC .............. *B60D 1/187* (2013.01); *B60D 1/182* (2013.01); *B60D 1/243* (2013.01); *G01M 17/0078* (2013.01)

(58) Field of Classification Search
CPC ...... B60D 1/187; B60D 1/182; B60D 1/243; G01M 17/007
See application file for complete search history.

(56) References Cited

U.S. PATENT DOCUMENTS 3,319,972 A * 5/1967 Gallaher ................. B62B 13/16
                                                    280/18
5,522,741 A * 6/1996 Yun ........................ B63H 16/12
                                                   114/354

(Continued)

FOREIGN PATENT DOCUMENTS

DE   11 17 399     11/1961
DE   71 23 421 U   2/1972

(Continued)

OTHER PUBLICATIONS

International Search Report of the International Searching Authority for International Application PCT/DE2013/200218, mailed Jul. 28, 2014, 2 pages, European Patent Office, HV Rijswijk, Netherlands.

(Continued)

*Primary Examiner* — Kevin Hurley
(74) *Attorney, Agent, or Firm* — W. F. Fasse (57) ABSTRACT

A connecting device (4) for connecting a target object (1) to a towing vehicle (3) for functionally testing a driver assistance system of a test vehicle (7) for test driving, includes two deformable pressurizable hoses that extend in a longitudinal direction (e.g. from the towing vehicle to the target object) and that are connected to each other transversely to the longitudinal direction. A test arrangement includes the towing vehicle connected to the target object by the connecting device.

17 Claims, 6 Drawing Sheets

(56) References Cited

U.S. PATENT DOCUMENTS

| | | | |
|---|---|---|---|
| D378,079 S * | 2/1997 | Lavino | D12/317 |
| 6,582,264 B2 * | 6/2003 | Brown | B63B 7/082 |
| | | | 114/354 |
| 7,240,445 B2 * | 7/2007 | Barlow | G09F 21/20 |
| | | | 114/121 |
| 2012/0285229 A1 * | 11/2012 | Sacher | G01M 17/08 |
| | | | 73/118.01 |
| 2013/0238166 A1 * | 9/2013 | Breu | G01M 17/007 |
| | | | 701/2 |
| 2015/0149031 A1 * | 5/2015 | Pfister | G07C 5/085 |
| | | | 701/33.4 |

FOREIGN PATENT DOCUMENTS

| | | |
|---|---|---|
| DE | 29 10 910 | 10/1980 |
| DE | 296 19 702 U | 1/1997 |
| DE | 202009008752 U | 11/2009 |

OTHER PUBLICATIONS

PCT International Preliminary Report on Patentability including English Translation of PCT Written Opinion of the International Searching Authority for International Application PCT/DE2013/200218, issued Apr. 21, 2015, 7 pages, International Bureau of WIPO, Geneva, Switzerland.

German Search Report for German Patent Application No. 10 2012 110 586.3, dated Jun. 13, 2013, 5 pages, Muenchen, Germany, with English translation, 5 pages.

* cited by examiner

CONNECTING DEVICE FOR CONNECTING A TARGET OBJECT TO A TOWING VEHICLE FOR TEST DRIVING FOR FUNCTIONALLY TESTING A DRIVER ASSISTANCE SYSTEM AND CORRESPONDING TEST ARRANGEMENT

FIELD OF THE INVENTION

The invention relates to a device for connecting a target object to a towing vehicle for test driving for functionally testing a driver assistance system, and a test arrangement wherein said device is used.

BACKGROUND INFORMATION

Vehicle safety has been constantly increased in the last few decades through continuous further development of passive safety elements. In addition to passive systems which reduce the consequences following an accident, active safety systems are becoming increasingly important for preventing accidents and mitigating the consequences of accidents. In order to reduce the consequences of an accident involving a collision or, ideally, to prevent a collision entirely, some manufacturers are offering so-called assistance systems with adaptive cruise control and distance warnings, as well as systems with brake assist and/or emergency brake assist. Such assistance systems use radar sensors, cameras and/or lasers to detect preceding vehicles and warn the driver in the event of an imminent collision. These driver assistance systems are therefore generally based on sensor technology which monitors the surroundings. If the driver does not react to this warning and a collision is unavoidable, the system automatically applies the brakes. The impact speed is reduced or the accident can even be completely prevented. In addition, in the field of active safety systems, safety systems which automatically steer the vehicle around an obstacle if a collision is detected, i.e. systems which perform an autonomous avoiding maneuver, are also known.

In one aspect, the invention generally relates to a test arrangement for test driving, where a target object can be towed behind a towing vehicle, in particular to test the above-mentioned safety and assistance systems. In this case, an accident involving a collision between a test vehicle and the target object can, in particular, be simulated. Another aspect of the invention relates more particularly to a device for connecting the target object to the towing vehicle. Any target object (target) can be used, preferably a light and relatively soft dummy vehicle (for example a so-called balloon car on guide rollers or wheels), which is connected to the towing vehicle by the connecting device and towed behind the latter.

There is currently a known system from ADAC (Aligemeiner Deutscher Automobil-Club e. V.) [General German Automobile Association]. In this case, a sledge moves on a ladder frame made of steel, which the towing vehicle tows behind it. The target object is located on the sledge. However, the sledge considerably increases the mass with which the test vehicle collides, particularly since the structure is rigid, and the sledge weighs many times the weight of the actual test object. This increases the risk of damage to the test vehicle. The rigid rail also prevents a safe avoiding maneuver by the test vehicle after the collision, because after the sledge is moved, the rail is located under the test vehicle. This constitutes a high risk for the test drivers, at the same time preventing it from being used for testing (emergency) avoidance systems.

A balloon towing system for towing a motor vehicle is known from DE 71 23 421 U1, where the balloon towing system can be easily transported in the vehicle in its deflated state due to its small size, but can be made ready for operation by inflating the towing balloon, and the elastic covering can also act as a buffer for collisions between the towing vehicle and the vehicle to be towed within certain limits. However, the distance between the towing vehicle and the vehicle to be towed is very small and is substantially constant, except for small changes during impacts, but cannot under any circumstances offer a sufficient safety margin for the towed vehicle, in particular during a collision of another vehicle with the vehicle to be towed.

SUMMARY OF THE INVENTION

An object underlying an embodiment of the invention is to provide a towing connector device for a test arrangement with which a target object can be connected to a towing vehicle, wherein the disadvantages of known test arrangements as indicated above are preferably avoided and which can, in particular, also be used for testing avoidance systems.

The above object can be achieved by one or more of the embodiments of the invention disclosed or claimed herein. Furthermore, combinations of disclosed or claimed individual features with one another and further developments of individual features are also encompassed by the invention.

An underlying concept of one or more of the embodiments of the invention is, in particular, to design the connection and/or the connecting device between the towing vehicle and the target object in a flexible manner to a certain degree. The distance from the towing vehicle to the target object, i.e. in particular the length of the connecting device, can be adapted to the test speeds.

An embodiment of the connecting device is, in particular, intended to meet the following requirements:

To tow the target object—tensile forces,
To guarantee a constant distance between the target object and the towing vehicle, preferably also during (full) braking of the towing vehicle,
To be flexible in the event of a collision and to allow the target object (target) and the towing vehicle to approach one another.

To this end, the device according to an embodiment of the invention comprises at least two deformable hoses which are connected to one another transversely to the longitudinal direction by means of at least one connecting element. The hoses can preferably be connected and/or are preferably connected via suitable means e.g. first and second connection fixtures at the ends, i.e. at both their ends, to a towing vehicle and a target object, so that the at least one hose extends along its length between the towing vehicle and the target object. In addition, the hoses and/or their internal volumes can be and/or are hydraulically or pneumatically pressurized.

The device according to an embodiment of the invention is used in particular to connect a target object to a towing vehicle within the context of test driving where driving situations involving near-collisions or collisions between a test vehicle and the target object are simulated. The target object is preferably moved during the test drives, in particular such that it is towed behind the towing vehicle. In connection with this, the hoses are substantially used to transmit acceleration forces from the towing vehicle to the target object, i.e. they transmit positive acceleration forces and compression forces, i.e. negative acceleration forces and/or braking forces from the towing vehicle to the target object.

The hose therefore serves, in particular, to keep the distance between the towing vehicle and the target object constant while at the same time maintaining tracking stability. To this end, the device comprises at least two, therefore in particular two or three, deformable hoses (although even more deformable hoses are also generally conceivable), which are in particular arranged next to one another, said deformable hoses being connected to one another by means of at least one connecting element transversely to the longitudinal direction. Such an arrangement has a significantly higher transverse stability than just one hose.

The hoses preferably constitute at least in part, i.e. at least on a partial section of the entire connection between the towing vehicle and the target object, the only connecting device between the towing vehicle and the target object and thus the only device for transmitting the acceleration forces.

The device according to one or more embodiments of the invention has several advantages compared with the devices previously used for connecting a target object to a towing vehicle within the context of test driving.

Due to the use of pneumatically or hydraulically pressurized, deformable hoses, the device is substantially rigid with respect to tractive forces. The hose only extends by relatively small amounts, if at all, during acceleration maneuvers, as a result of which positive acceleration forces can be constantly transmitted from the towing vehicle to the target object.

The hoses are, at the same time, particularly rigid with respect to compressive forces to a certain degree. In the case of negative accelerations up to a specified load, i.e. during braking of the towing vehicle, if the internal volume of the hose is at a sufficiently high pressure, no bulging, buckling, and/or bending phenomena of the hose or hoses occur(s), as a result of which negative acceleration (braking) can, in particular, also be directly transmitted from the towing vehicle to the target object to some extent.

Another advantage is that once a certain load is reached, in particular an impact of a test vehicle with the target object, the plurality of hoses lose their stability/rigidity.

This is particularly the case in the event of a collision of the test vehicle with the target object, i.e. during collision test driving with a correspondingly high difference in speed between the target object and the test vehicle. This generally results in buckling and/or bending of the one or more hoses and, as a result, bulging of the entire device.

The design, i.e. the device according to the invention, is thus sufficiently rigid in order to transmit both accelerations and decelerations of the towing vehicle to the target object, for example up to a load limit of 1 g for example—but is still flexible enough, in the event of a collision of the test vehicle with the target object and, therefore, loads clearly exceeding the 1 g limit, to buckle. As a result, it is possible, in particular during collision test driving, to absorb and compensate for high impact forces with, ideally, no damage being sustained by the test vehicle, the towing vehicle and the target object, but at least collisions with the towing vehicle are avoided. At the same time this helps to reduce the risks to the drivers of the towing vehicle and test vehicle.

Thanks to the pushing together and/or buckling of the deformable hoses, it is possible for the test vehicle to leave the lane safely, including in particular after a collision has occurred.

In particular, due to the pushing together and/or buckling of the deformable hoses and/or of the entire connecting device, no elements remain under the test vehicle, which is the case for example with the known systems.

Further advantages of the invention, some of which have already been mentioned, of the connecting device according to the invention, are in particular:

Low weight,

No fixed (rigid) elements in the collision area,

Avoiding maneuvers after a collision has occurred can be safely carried out,

Can be used for test driving with autonomous braking and avoidance systems,

Feasibility of test driving including maximum target object deceleration of approx. 1 g (g=acceleration due to gravity), No radar-affecting components, etc. in the area of the target object.

Within the framework of the invention, the target object can generally be any two-dimensional or three-dimensional simulation of any road user, in particular a vehicle, cyclist, animal and/or human. The target object can, in addition, be configured with one or more sensors which measure, for example, loads acting on the target object during test driving, especially in the event of a collision with a test vehicle. The target object is preferably a so-called balloon car, as used for test driving, i.e. a dummy vehicle, which can be guided across the road surface on wheels or rollers.

The towing vehicle and also the test vehicle are preferably passenger cars. Both vehicles can be motor vehicles approved for use on public roads. The test vehicle is preferably equipped with at least one safety system and/or (driver) assistance system, in particular with one of the systems mentioned in the introduction, which are tested as part of test driving.

Within the framework of the invention the term 'deformable hose' can be used to denote all hose-like bodies, in particular flexible bodies having a length which is greater than their width and height and which are formed with a hollow interior volume which extends over the length of the body. The term 'hose' is used in particular to denote a narrow and long, tubular-shaped and flexible body with a cylindrical internal volume. The hose is especially configured such that the latter is suitable for receiving and/or conveying liquid, gaseous and solid materials, in particular at a higher pressure than the ambient pressure. The hose can be configured with couplings and/or valves at the ends for introducing materials into the internal volume and for sealing the internal volume.

The term 'deformable hose' is, in particular, used to denote a flexible, pliable and/or elastically deformable hose.

The term 'pneumatic pressurization' is, in particular, used to denote the pneumatic application of compressed air or other gaseous medium while hydraulic pressurization denotes, in particular, the application of water or other liquid medium.

The term 'suitable means for connecting the device at the ends', in particular of the one or more deformable hoses, can be used to denote all connection fixtures which are suitable for connecting the device according to the invention at the ends to the towing vehicle and the target object. These connection fixtures include, for example, hooks, eyelets and clamping elements, etc. The device can, for example, be configured at one end with an eyelet for suspension in a trailer coupling of the towing vehicle and at the other end with a receptacle, e.g. a trolley or roller sledge, for the arrangement of different target objects. If the device comprises a plurality of deformable hoses arranged in parallel next to one another, these can additionally be coupled to one another at the ends by means of a suitable device and the device can, in turn, be configured so that it can be connected to the towing vehicle and/or the target object using suitable means.

According to a preferred embodiment of the device according to the invention, the at least one deformable hose is a pressure hose. A pressure hose is generally made of synthetic fabric (polyester) and is gummed internally. It generally has a flexible form and can be collapsed flat when it is not under pressure. The advantage of this is that it can be transported in a space-saving manner.

According to a further preferred embodiment, the device according to the invention comprises two deformable hoses which are arranged next to one another, in particular parallel to one another, in the longitudinal direction, i.e. along their length, and are connected to one another transversely to the longitudinal direction by means of at least one rigid connecting element. The two hoses are preferably arranged parallel to one another at a specified distance, wherein the at least one rigid connecting element in particular ensures that the distance is kept constant.

According to a particular embodiment, the device according to the invention comprises three deformable hoses which are arranged next to one another, in particular parallel to one another, in the longitudinal direction, and are connected to one another transversely to the longitudinal direction by means of at least one rigid connecting element. The hoses are preferably arranged parallel to one another at a specified distance, wherein the at least one rigid connecting element in particular ensures that the distance is kept constant. In addition, the deformable hoses are preferably arranged with respect to one another such that they generate a triangle in the plane located transversely to the longitudinal direction. This means that the hoses represent vertices of a hypothetical triangle in the plane perpendicular to the longitudinal direction.

In the embodiment of the device according to the invention having two or more deformable hoses, which are arranged next to one another along their length, these are preferably connected by means of a plurality of rigid connecting elements transversely to the longitudinal direction, wherein the connecting elements are arranged at specified distances from one another between the deformable hoses in the longitudinal direction. The size of the distances also defines weak points and, thus, preferred breaking points of the hoses.

According to an advantageous embodiment of the device according to the invention, the one or more hoses and/or one or more of the connecting elements are configured with guide rollers and/or sliding elements. The guide rollers and/or the sliding elements are, in particular, used to prevent sagging and fraying of the hoses on the road surface.

In one embodiment of the device according to the invention having two or more deformable hoses, these are designed as a composite hose according to a further advantageous embodiment. This means that the hoses are preferably arranged parallel to one another without a gap and are connected to one another. The hoses can, in this case, be tied together, for example by means of suitable means, to form a bundle.

The test arrangement according to the invention comprises a towing vehicle and a target object and is used for test driving, especially for near-collision and collision test driving, between a test vehicle and the target object. The target object is thus formed by means of a device according to any one of the foregoing embodiments.

The test arrangement can additionally be designed in an advantageous embodiment with two or more guide ropes which are arranged between the towing vehicle and the target object. The guide ropes can, in particular, be arranged laterally next to the connecting device according to the invention, i.e. in particular next to the connecting device on the left and right sides in the longitudinal direction. The guide ropes are preferably used for adjusting and/or for readjusting the movement path of the target object and/or for pulling the target object towards the towing vehicle, for example in the event of collision test driving. In addition, the guide ropes are, in particular, not used for transmitting acceleration forces from the towing vehicle to the target object.

BRIEF DESCRIPTION OF THE DRAWINGS

Further advantages as well as optional embodiments will be apparent from the specification and the drawings. Embodiment examples are shown in a simplified form in the drawings and are explained in more detail in the following description, where.

DETAILED DESCRIPTION OF EXAMPLE EMBODIMENTS OF THE INVENTION

Figure 1:
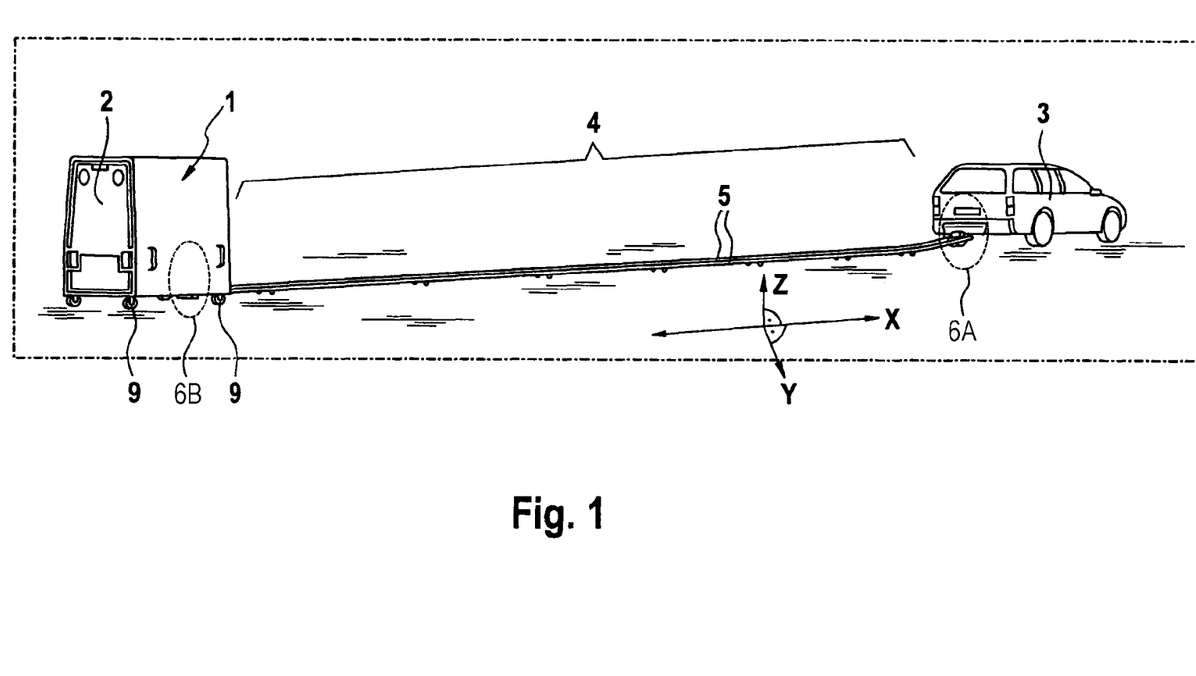
FIG. 1 shows a preferred embodiment of the test arrangement according to the invention.

FIG. 1 shows a preferred embodiment of the test arrangement according to the invention. The test arrangement is used for test driving between a test vehicle 7 (not shown in FIG. 1, but shown in FIG. 6) and a target object 1, especially near-collision and collision test driving. The target object 1 is, in this case, a dummy vehicle. The dummy vehicle is substantially constructed as a rectangular body which has vehicle-specific features on at least one side, preferably the back 2. The vehicle-specific characteristics may be, for example, reflectors, lighting devices and/or a vehicle registration plate. In addition to the target object 1, the test arrangement also includes a towing vehicle 3. The towing vehicle 3 is, in this case, a passenger car. The target object 1 and the towing vehicle 3 are connected to one another by means of a connecting device according to the invention 4. The device 4 comprises, in accordance with the invention, at least one deformable hose 5 which is connected at the ends thereof by a first connection fixture 6A and a second connection fixture 6B respectively to the towing vehicle 3 and the target object 1. In this case, the device 4 comprises two hoses 5, in particular, two pressure hoses and/or textile hoses, the internal volumes of which are pneumatically pressurized. The hoses 5 are arranged parallel to one another in the longitudinal direction X and are connected to one another transversely (Y) to the longitudinal direction X by means of a plurality of rigid connecting elements 8 (not shown in more detail in FIG. 1). The connecting elements 8 are arranged spaced apart in the longitudinal direction X between the deformable hoses 5 and each comprise guide rollers 11 which serve to prevent the hoses 5 resting and chafing on the road surface.

Within the context of test driving, the target object 1 can be towed by the test arrangement according to this embodiment of the invention, especially by the connecting device 4 according to this embodiment of the invention, behind the towing vehicle 3. The device 4 is substantially used to transmit acceleration forces from the towing vehicle 3 to the target object 1. Furthermore, a test vehicle 7, for example also a passenger car, can follow behind the target object 1, wherein the test vehicle 7 is equipped with one or more sensors for detecting the surroundings 15, for example a radar sensor emitting radar beams 16 as well as appropriate assistance systems, e.g. having an (emergency) brake assist and/or avoiding assistants. By means of the test arrangement according to the invention, it is therefore possible to simulate driving situations involving near-collisions and collisions between the test vehicle and the target object 1 and to examine the response of the test vehicle's assistance systems.

Significant advantages of the test arrangement according to the invention and of the connecting device 4 according to the invention are, in particular due to the use of pressurized hoses 5, that the device 4 is sufficiently rigid to transmit both decelerations and accelerations of the towing vehicle 3 to the target object 1, but flexible enough to buckle in the event of a collision of the test vehicle with the target object 1, as best shown in FIG. 6. As a result, it is possible, in particular during collision test driving, to absorb and compensate for high impact forces with, preferably, no damage being sustained by the test vehicle and the target object 1. At the same time this helps to reduce the risks to the drivers of the towing vehicle 3 and test vehicle. Thanks to the device 4 being pushed together, it is possible for the test vehicle to leave the lane safely, including in particular after a collision has occurred. Due to the pushing together of the connecting device 4, no elements remain under the test vehicle, which is the case for example with the known systems. The other significant advantages of the test arrangement according to the invention and of the connecting device 4 according to the invention have already been mentioned above in the specification and will not be repeated here. The distance in the longitudinal direction X, and therefore the length of the device 4, can be configured as desired and, as shown in FIG. 1, can be 15 m for example.

Figure 2:
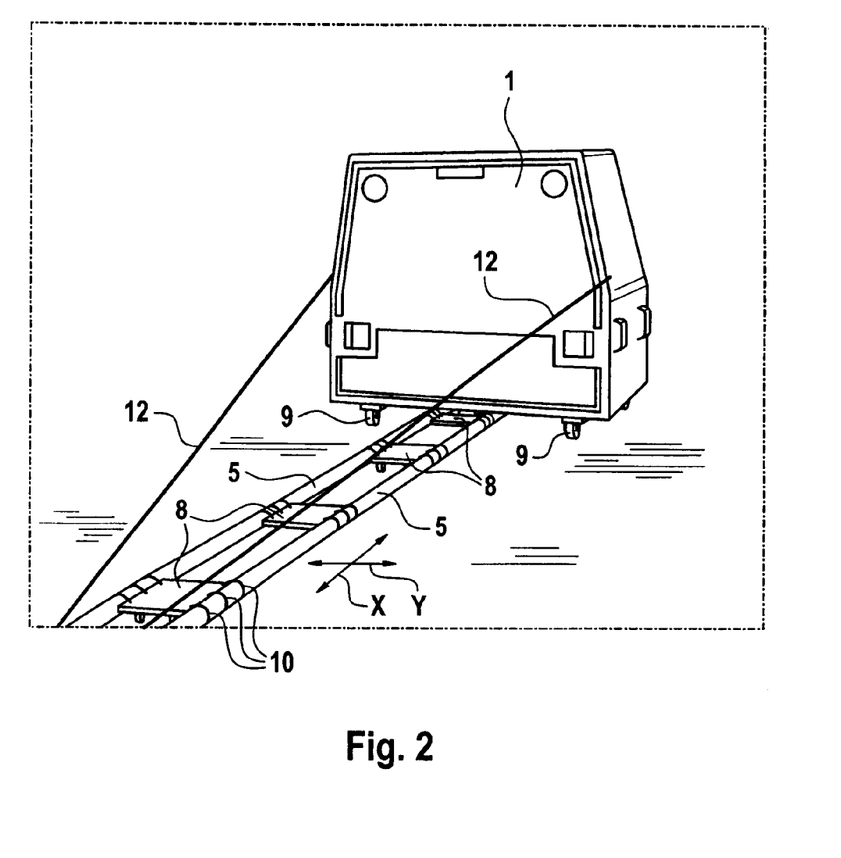
FIG. 2 shows the test arrangement according to the invention from FIG. 1 in an embodiment with guide ropes.

FIG. 2 is a more detailed view of a portion of the test arrangement according to the invention from FIG. 1. The target object 1, which is arranged on guide rollers 9 and connected to the connecting device 4 according to the invention, is shown. The device 4 for connecting the target object 1 to the towing vehicle 3 (not shown in FIG. 2) comprises, in accordance with the description regarding FIG. 1, in this case, two deformable hoses 5 which are supplied with compressed air. The hoses 5 are arranged parallel to one another in the longitudinal direction X, i.e. along their length, and are connected to one another by means of several connecting elements 8. In FIG. 2 the connecting elements 8 are configured, for example, as wooden boards which are connected by means of cable ties 10 to the hoses 5. The connecting elements 8 additionally comprise guide rollers 11.

In addition to FIG. 1, FIG. 2 shows an advantageous embodiment of the test arrangement according to the invention, namely how additional tracking of the target object 1 can be achieved by two or more lateral guide ropes 12. The guide ropes 12 are arranged on both sides next to the hoses 5 of the connecting device 4. By pulling on one of the two guide ropes 12, additional guidance and readjustment of the target object 1 and/or its movement track is made possible. It is also possible to pull the target object 1 towards the towing vehicle 3 via the guide ropes 12, for example to remove the target object 1 from the collision area.

Figure 3A:
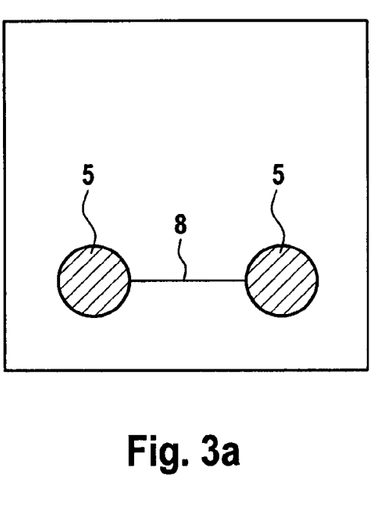
FIG. 3 shows different embodiments of the device according to the invention for connecting a target object to a towing vehicle.
Figure 3B:
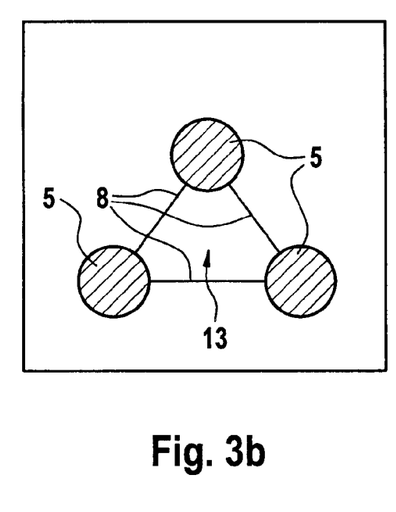

FIG. 3 shows, in schematic form, two different possible embodiments of the device 4 according to the invention for connecting a target object 1 to a towing vehicle 3. FIG. 3 shows how the hoses 5, viewed in the plane which is located transversely to the longitudinal direction X, i.e. transversely to the length of the hoses 5, can be arranged with respect to one another. In the left-hand illustration three hoses 5 are arranged with respect to one another such that the hoses 5 generate a hypothetical (imaginary) triangle in the plane located transversely to the longitudinal direction X, wherein the hoses 5 represent the vertices of the triangle 13 in this case. In the right-hand illustration, two hoses 5 are arranged with respect to one another such that these are arranged side by side, i.e. at the same height and/or at the same distance from the road surface.

Figure 4:
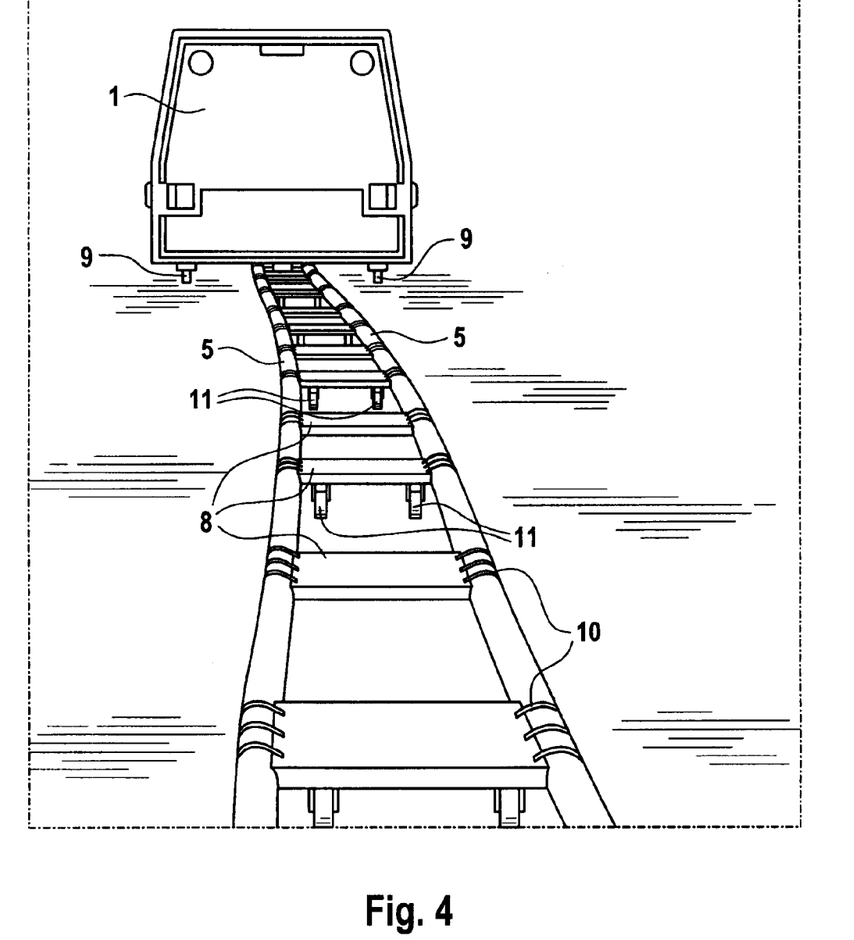
FIG. 4 shows a further illustration of the test arrangement according to the invention from FIG. 1 from a different perspective.

FIG. 4 again shows the test arrangement according to the invention from FIG. 1 and FIG. 2 respectively from a different perspective. The test arrangement in this case has the same design as that described for FIGS. 1 and 2.

Figure 5:
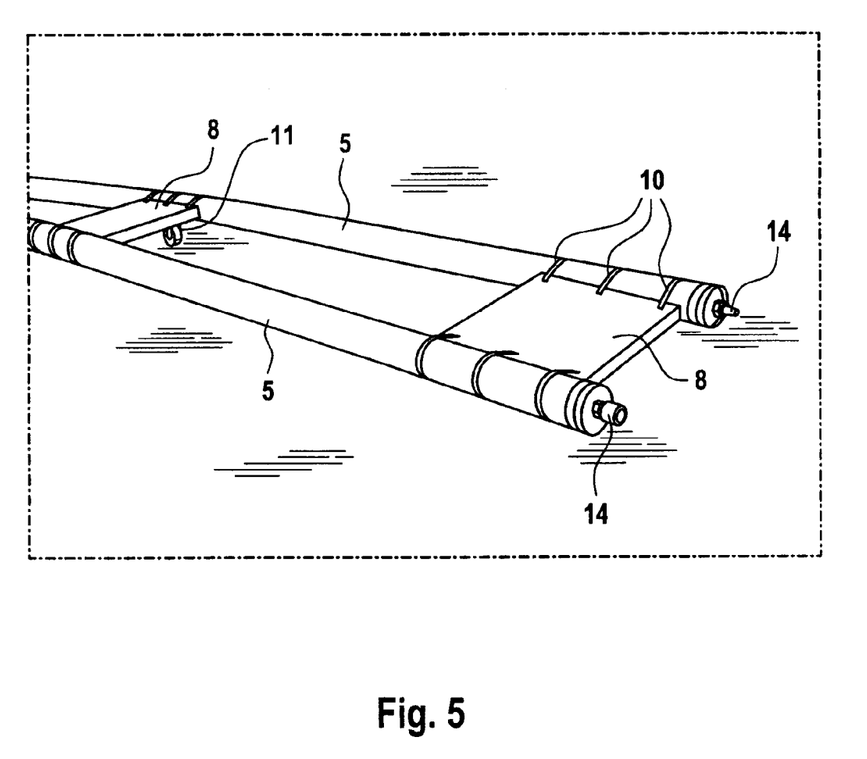
FIG. 5 shows an advantageous embodiment of the device according to the invention for connecting a target object to a towing vehicle.

FIG. 5 shows an embodiment of the device 4 according to the invention for connecting a target object 1 to a towing vehicle 3. The device 4 in this case has the same design as that described for FIGS. 1 and 2. The two hoses 5 which have valves and/or closure elements 14, by means of which the hoses 5 can be pneumatically or hydraulically pressurized, are shown in more detail in FIG. 5.

Figure 6A:
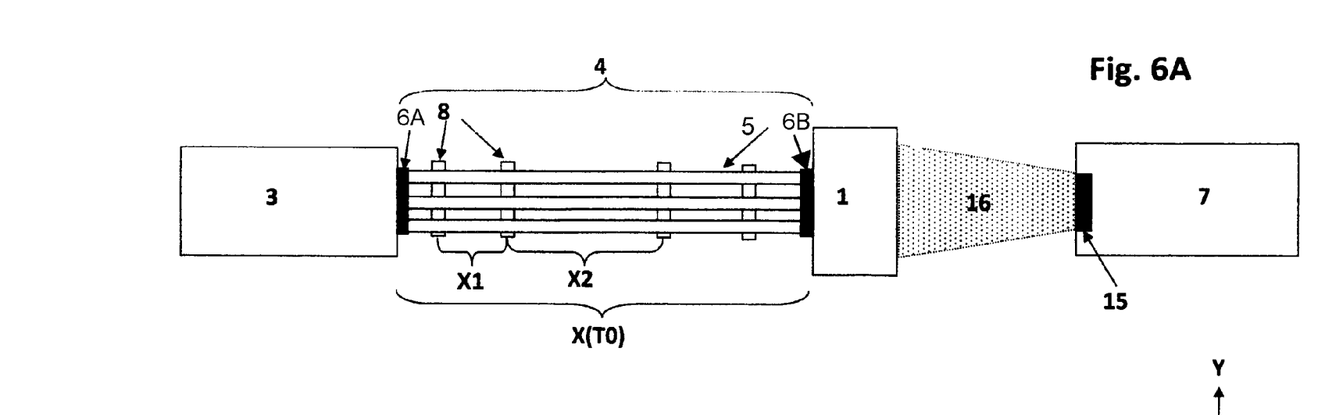
FIG. 6 shows the configuration and conduct of the test arrangement according to the invention during test driving.
Figure 6B:
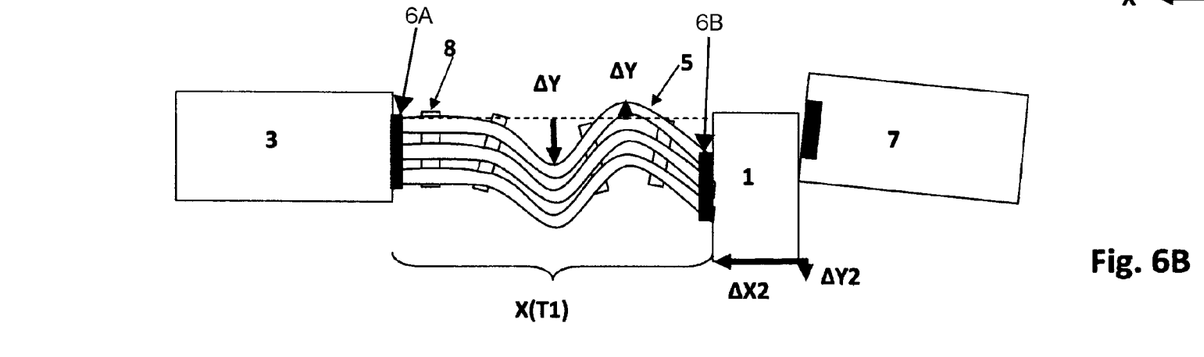

FIGS. 6A and 6B give an outline of the behavior during test driving before (FIG. 6A) and during (6B) a collision of the test vehicle 7 with the target object 1. In this example embodiment, the device 4 includes three hoses 5 that are provided in a triangular cross-sectional arrangement in accordance with FIG. 3B and are held together by a total of four connecting elements 8, wherein the respective distance X1, X2 between the connecting elements 8 is different and produces, in total, a total length X (T0) between the towing vehicle 3 and the target object 1. At its forward end, the device 4 is connected by a first connection fixture 6A to the tow vehicle 3. At its rear end, the device 4 is connected by a second connection fixture 6B to the target object 1. The test vehicle 7, with its surroundings monitoring sensor 15 and driver assistance systems, comes into the vicinity of the target object 1 and detects the latter, as sketched by the beams 16. However, the differential speed of the test vehicle 7 is, in this case, so high compared to the towing vehicle 3 that the protection measures initiated are not sufficient and a collision occurs between the test vehicle 7 and the target object 1. It should again be expressly pointed out that such a collision is to be avoided during normal operation of the vehicle, but is deliberately brought about in the test driving here, for example, by deliberately overriding the interventions of the assistance system, in order to be able to test the reactions of the assistance systems, including in particular immediately before and during such a collision.

As FIG. 6B clearly shows, the impact of the test vehicle 7 results in an exceeding of the prescribed loading of the hoses 5 and thus a buckling or pushing away of the hoses 5 in the transverse direction, sketched here as ΔY and, as a result, the target object 1 can making an avoiding maneuver, both in the longitudinal direction ΔX2 and the transverse direction ΔY2, in particular in that the total length X(T1) of the device 4 is reduced accordingly by this pushing together. As a result, during the collision of the test vehicle 7 with the target object 1, only very small additional forces are applied to these objects and greater damage can therefore be avoided.

LIST OF REFERENCE NUMERALS

1 Target object
2 Side wall of the target object
3 Towing vehicle
4 Connecting device
5 Deformable hose
6A, 6B First and second connection fixtures
7 Test vehicle
8 Connecting element
9 Guide rollers (target object)
10 Cable ties
11 Guide rollers (connecting elements)
12 Guide rope
13 Hypothetical triangle
14 Locking elements
15 Surroundings monitoring sensor technology of the driver assistance system
16 Beams of the surroundings monitoring sensor technology
X Longitudinal direction/driving direction
Y Transverse direction/transverse axis
Z Vertical axis

The invention claimed is:

1. A device for connecting a target object to a towing vehicle for functionally testing a driver assistance system of a test vehicle for test driving, especially for near-collision and collision test driving, comprising:
   at least two deformable hoses, which are configured and adapted to be connected at two opposite ends thereof to the towing vehicle and to the target object respectively, and which are effective to transmit acceleration forces from the towing vehicle via the hoses to the target object, wherein an internal volume of the hoses can be hydraulically or pneumatically pressurized,
   at least one connecting element, wherein the hoses are connected to one another transversely to a longitudinal direction by the at least one connecting element, and
   guide rollers and/or sliding elements that are arranged on at least one of the connecting elements and that are oriented toward a roadway on which the towing vehicle is supported.

2. The device according to claim 1, wherein the hoses are arranged parallel to one another at least in sections in the longitudinal direction.

3. The device according to claim 1, comprising three of the deformable hoses, wherein the deformable hoses are arranged with respect to one another in a triangular configuration in a plane extending transversely to the longitudinal direction.

4. The device according to claim 1, wherein the deformable hoses are connected by a plurality of the connecting elements extending transversely to the longitudinal direction, wherein the connecting elements are arranged at specified distances from one another in the longitudinal direction.

5. The device according to claim 1, wherein the hoses are rigid with respect to tensile and/or compressive loads between the towing vehicle and the target object up to a specified load, and the device is configured and adapted to buckle by snapping and/or bending of the hoses transversely to the longitudinal direction when the specified load is exceeded, in a correspondingly severe collision of the test vehicle with the target object.

6. The device according to claim 1, further comprising a trolley or a roller sledge that is arranged and connected at one of the two opposite ends of the hoses, and that is configured and adapted to receive the target object mounted thereon.

7. A combination comprising the device according to claim 1 and the target object connected to one of the two opposite ends of the hoses, wherein the target object is to be towed via the device, and wherein the target object comprises a test dummy object comprising a representation of a motor vehicle, a cyclist, a human pedestrian, or an animal.

8. A test arrangement for functionally testing a driver assistance system of a test vehicle for test driving, especially for near-collision and collision test driving, between the test vehicle and a target object,
   wherein the test arrangement comprises the towing vehicle, the target object, and a device that connects the target object to the towing vehicle,
   wherein the device comprises:
   at least two deformable hoses, which are configured and adapted to be connected at two opposite ends thereof to the towing vehicle and to the target object respectively, and which are effective to transmit acceleration forces from the towing vehicle via the hoses to the target object, wherein an internal volume of the hoses can be hydraulically or pneumatically pressurized, and
   at least one connecting element, wherein the hoses are connected to one another transversely to a longitudinal direction by the at least one connecting element.

9. The test arrangement according to claim 8, further comprising plural guide ropes extending between the towing vehicle and the target object.

10. A device for connecting a target object to a towing vehicle for functionally testing a driver assistance system of a test vehicle for test driving, especially for near-collision and collision test driving, comprising:
   at least two deformable hoses, which are configured and adapted to be connected at two opposite ends thereof to the towing vehicle and to the target object respectively, and which are effective to transmit acceleration forces from the towing vehicle via the hoses to the target object, wherein an internal volume of the hoses can be hydraulically or pneumatically pressurized,
   at least one connecting element, wherein the hoses are connected to one another transversely to a longitudinal direction by the at least one connecting element, and
   connection fixtures on the two opposite ends of the hoses configured and adapted to be connected to the towing vehicle and to the target object respectively.

11. A towing connector device for connecting a target object to a tow vehicle via the towing connector device so that the tow vehicle can tow the target object via the towing connector device, which comprises:
   plural deformable pressurizable hoses that each extend longitudinally in a longitudinal direction,
   plural transverse elements that are spaced apart from one another in the longitudinal direction, and that each extend in a transverse direction transverse to the longitudinal direction, and that connect the plural hoses to one another in the transverse direction,
- a first connection fixture at a first end of the hoses, wherein the first connection fixture is configured and adapted to be connected to the tow vehicle, and
- a second connection fixture at a second end of the hoses opposite the first end in the longitudinal direction, wherein the second connection fixture is configured and adapted to be connected to the target object, wherein:
- the hoses are configured and adapted to transmit tension forces through the hoses in the longitudinal direction, sufficient for the tow vehicle to tow the target object via the towing connector device, and
- the hoses are configured and adapted to transmit compression forces through the hoses in the longitudinal direction up to a compression load limit, and the hoses are configured and adapted to buckle or bend out of the longitudinal direction whereby the first and second connection fixtures move closer to one another when the hoses are subjected to compression forces in the longitudinal direction exceeding the compression load limit.

12. The towing connector device according to claim 11, wherein the hoses are configured and adapted so that the compression load limit is above a compression force that arises in the hoses due to deceleration of the tow vehicle and therewith deceleration of the target object, and so that the compression load limit is below a compression force that arises in the hoses due to a rear-end collision of a test vehicle into the target object.

13. The towing connector device according to claim 11, wherein the hoses are configured so that the compression load limit corresponds to an acceleration of 1 g applied to the target object toward the tow vehicle.

14. The towing connector device according to claim 11, wherein the hoses provide the only tension and compression transmission through the towing connector device from the first connection fixture to the second connection fixture.

15. The towing connector device according to claim 11, further comprising rollers or slide elements interposed between the transverse elements and a ground surface on which the rollers or slide elements are supported.

16. A combination comprising the towing connector device according to claim 11 and the target object connected to the second connection fixture.

17. The combination according to claim 16, wherein the target object is a test dummy object comprising a dummy representation of a motor vehicle, a cyclist, a human pedestrian, or an animal.

* * * * *